United States Patent [19]
Arick et al.

[11] 3,791,419
[45] Feb. 12, 1974

[54] APPARATUS AND METHOD FOR FORMING WAVE WINDING FOR DYNAMOELECTRIC MACHINE

[75] Inventors: Robert E. Arick, Fort Wayne, Ind.; Ralph A. Vogel, Three Rivers, Mich.

[73] Assignee: Essex International, Inc., Fort Wayne, Ind.

[22] Filed: Oct. 16, 1972

[21] Appl. No.: 297,654

[52] U.S. Cl. ............ 140/92.1, 29/205 R, 29/205 D, 29/598, 29/605, 29/606, 140/1
[51] Int. Cl. ............................................. B21f 3/00
[58] Field of Search 29/596, 605, 606, 205 R, 205 D; 140/92.1, 1

[56] References Cited
UNITED STATES PATENTS
3,575,218   4/1971   Preece ................................. 140/1
3,672,040   6/1972   Arnold ................................. 29/596

*Primary Examiner*—Charles W. Lanham
*Assistant Examiner*—Carl E. Hall

[57] ABSTRACT

An apparatus and method for forming and placing a skein of wire on a circular array of blades of coil insertion apparatus for subsequent transfer thereby to the slots of a dynamoelectric machine stator core member to form a wave winding. A generally circular skein of wire is generated and is then initially formed into an undulating configuration having at least two convexly curved loop sections respectively joined by connecting portions to intermediate, concavely curved sections. The thus-formed skein is thereafter transferred onto the blades of the coil insertion apparatus with the loop sections being disposed on the exterior of the array and respectively spanning first groups of the blades, the intermediate sections being disposed on the interior of the array and respectively spanning second groups of the blades, and the connecting portions respectively passing between respective pairs of blades at the ends of adjacent first and second groups.

APPARATUS AND METHOD FOR FORMING WAVE WINDING FOR DYNAMOELECTRIC MACHINE

BACKGROUND OF THE INVENTION

1. Field of the Invention

This invention relates generally to apparatus for forming and placing dynamoelectric machine coils on the blades of coil insertion apparatus, and more particularly to an apparatus and method for forming and placing a skein of wire on such blades for subsequent transfer for the slots of a dynamoelectric machine stator core member to form a wave winding.

2. Description of the Prior Art

U.S. Pat. No. 3,324,536 discloses apparatus for inserting or injecting prewound coils into the slots of a dynamoelectric machine stator core member to form a field winding. In the past, the windings inserted by such coil insertion apparatus have generally been of the type employing a plurality of pole groups of coils, each such pole group comprising a plurality of concentric coils of progressively greater pitch. Such prewound concentric coils have been hand-placed on the blades of the coil insertion apparatus, or have been placed thereon by apparatus such as that shown in U.S. Pat. No. 3,415,292.

In the so-called wave winding pattern commonly employed in polyphase alternating current dynamoelectric machines, a conductor or group of conductors is placed in the stator core slots in undulating or serpentine fashion, i.e., the conductor extends through a slot, forms an end turn on one side of the core spanning a number of slots, extends through another slot, forms another end turn on the opposite side of the core spanning a number of slots, and so on around the stator core. Wave windings have heretofore been formed using multi-turn skeins of wire, each such skein being placed in the stator slots in wave winding fashion as above described. Such skeins have generally been hand-placed in the stator slots although it is known to hand-place such skeins on the blades of coil insertion apparatus for insertion into the stator core slots thereby. To the best of the present applicant's knowledge, no apparatus has been provided for winding or generating such skeins and placing them upon the blades of coil insertion apparatus.

SUMMARY OF THE INVENTION

The invention, in its broader aspects, provides apparatus for forming and placing a skein of wire on a circular array of blades of coil insertion apparatus for subsequent transfer thereby to the slots of a dynamoelectric machine stator core member to form a wave winding including means for generating a skein of wire. Means are provided for initially forming the skein into an undulating configuration having at least two convexly curved loop sections respectively joined by connecting portions to intermediate, concavely curved sections, and for thereafter transferring the thus-formed skein onto the blades with the loop sections being disposed on the exterior of the array and respectively spanning first groups of the blades, the intermediate sections being disposed on the interior of the array and respectively spanning second groups of the blades, and the connecting portions passing between respective pairs of blades at the ends of adjacent first and second groups.

In accordance with the method of the invention in its broader aspects, a skein of wire is generated, formed into the above-described undulating configuration, and transferred to the blades of the coil insertion apparatus as above-described.

It is accordingly an object of the present invention to provide apparatus for forming and placing a skein of wire on a circular array of blades of coil insertion apparatus for subsequent transfer thereby to the slots of a dynamoelectric machine stator core member to form wave winding.

Another object of the invention is to provide a method of forming and placing a skein of wire on a circular array of blades of coil insertion apparatus for subsequent transfer thereby to the slots of a dynamoelectric machine stator core member to form a wave winding.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 1:
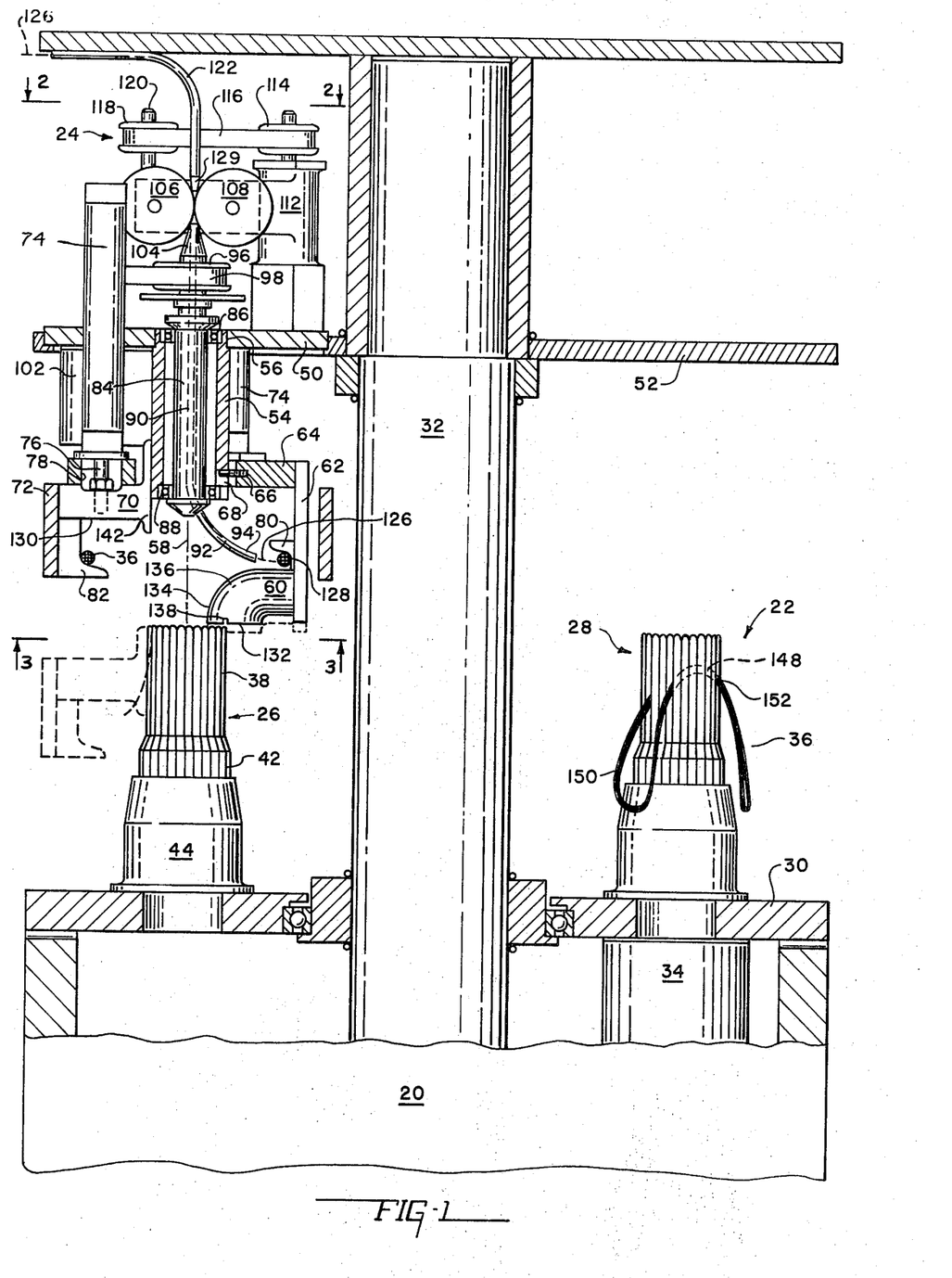
FIG. 1 is a side view, partly in cross-section and partly broken away, showing the apparatus of the invention.
Figure 2:
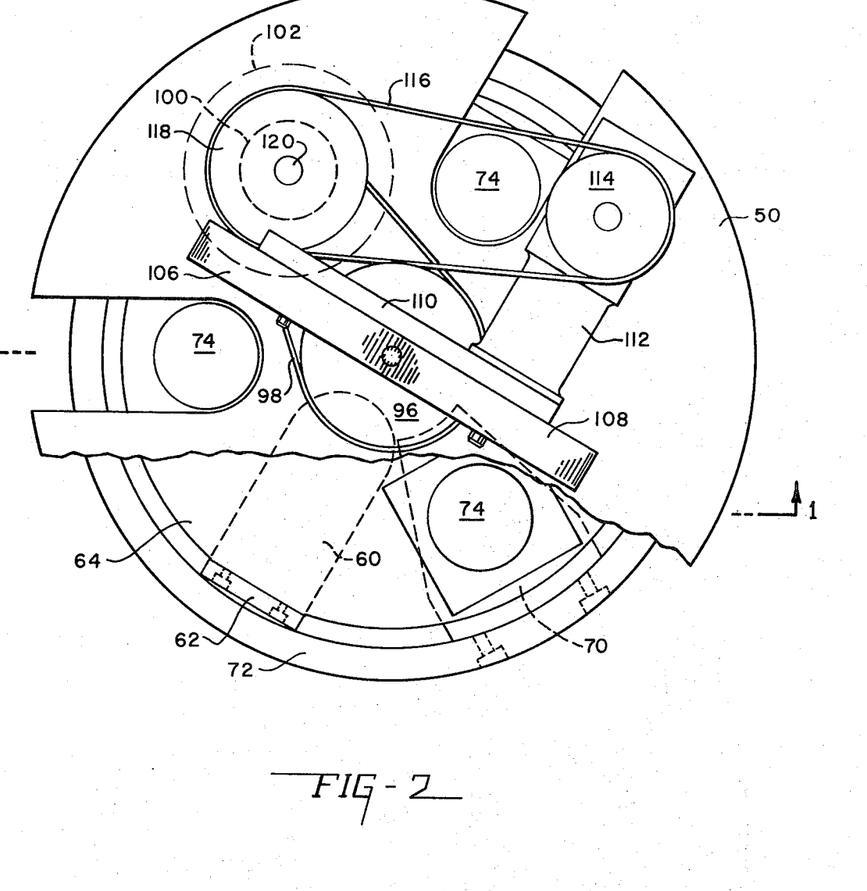
FIG. 2 is a fragmentary top view, partly broken away, taken generally along the line 2—2 of FIG. 1.
Figure 3:
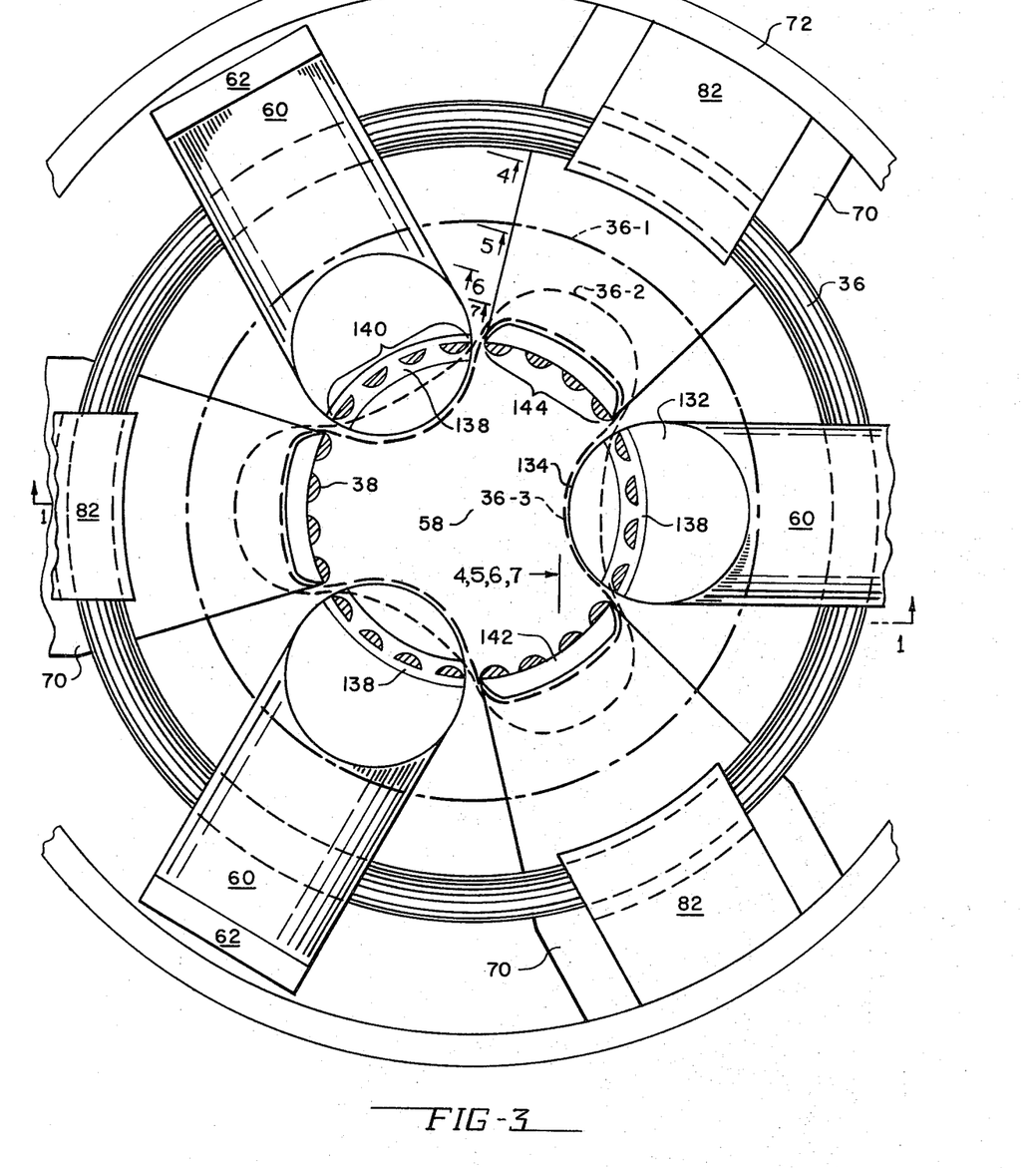
FIG. 3 is a fragmentary bottom cross-sectional view taken generally along the line 3—3 of FIG. 1, and also showing the sequence of forming and transferring the skein to the insertor blades.

Referring now to FIGS. 1, 2 and 3 of the drawings, the apparatus of the invention, generally indicated at 20, comprises a coil inserting assembly, generally indicated at 22, and a skein generating, forming and transferring assembly, generally indicated at 24.

In the illustrated embodiment, inserting assembly 22, which does not form a part of the present invention per se, comprises a pair of blade or finger assemblies 26, 28 for coil inserting apparatus of the general type shown in the aforesaid U.S. Pat. No. 3,324,536. Blade assemblies 26, 28 are mounted on turntable 30 rotatably mounted on support post 32. Blade assembly 26 is shown positioned at a loading station while blade assembly 28 is shown positioned at a coil inserting station, it being understood that blade assembly 26 may be rotated (by means not shown) to the coil inserting station with blade assembly 28 simultaneously being rotated to the loading station. Coil and wedge pushing apparatus 34 of the type shown in the aforesaid U.S. Pat. No. 3,324,536 is located at the coil inserting station and cooperates with the blade assembly at that station to transfer skein 36 (and other skeins not shown) from blade assembly 28 to a stator core member in the manner described in the aforesaid U.S. Pat. No. 3,324,536.

Each of the blade assemblies 26 and 28 comprises an upstanding, circular array of blades 38 respectively having distal ends 40 and proximal ends 42 mounted on base 44. In the illustrated embodiment for inserting skein 36 in slots 46 of a 24 slot stator core member 48 (FIG. 9), blade assemblies 26, 28 each comprise 24 blades 38.

Skein generating, forming and transferring assembly 24 is supported above the loading station by mounting plate 50 supported on plate 52 secured to post 32. Sleeve 54 is secured in opening 56 in mounting plate 50 and depends therefrom concentrically with axis 58 of the blade assembly 26, 28 at the loading station. In the illustrated embodiment intended for providing a six-pole wave winding for a 24 slot stator core member, three forming members 60 are provided equally angularly spaced around a circle concentric with axis 58 and extending radially inwardly toward axis 58. Each former forming member 60 is supported by member 62 secured to and depending from plate member 64. Plate member 64 has a lost motion connection with sleeve 54 provided by means of a plurality of pins 66 extending radially inwardly from plate member 64 received in slots 68 in the lower end of sleeve 54 (only one such pin 66 and slot 68 being shown).

Three other forming members 70 are provided equally angularly spaced around a circle concentric with axis 58 and extending radially inwardly toward axis 58. Forming members 70 are positioned intermediate forming members 60 and are secured to ring 72 which surrounds member 62. A plurality of fluid power cylinders 74 (three in the illustrated embodiment) are mounted on plate member 50 and extend therethrough. Piston rods 76 of cylinders 74 extend through openings 78 in plate member 64 and are respectively secured to forming members 70. It will now be seen that extension of piston rods 76 of cylinders 74 will move forming member 70 and ring 72 downwardly in a direction toward blade assembly 26, 28 from the position shown in solid lines in FIG. 1 to the position shown in dashed lines, as will hereafter be more fully described.

Each of the forming members 60 has an abutment member 80 secured to its top surface and each of the forming members 70 has an abutment member 82 depending therefrom, abutment members 80, 82 generally defining a circle and accommodating and forming skein 36 during winding or generating thereof as will now be described.

Spindle 84 is rotatably supported in sleeve member 54 by bearings 86, 88. Spindle 84 has central passage 90 formed therein coaxial with axis 58, passage 90 joining curved tube 92 extending radially outwardly and downwardly from axis 58 with its outer end 94 being adjacent abutment members 80, 82. Spindle 84 and tube 92 are rotated by means of pulley 96, belt 98 and pulley 100 driven by hydraulic motor 102 supported on mounting plate 50.

Spindle 84 has tapered end 104 positioned between rollers 106, 108 which are in engagement on axis 58. Rollers 106, 108 are rotatably mounted on plate member 110 secured to right-angle gear box 112 which drives roller 108 thereby driving roller 106. Right-angle gear box is driven by pulley 114, belt 116 and pulley 118 on shaft 120 of hydraulic motor 102.

Tube 122 has end 124 positioned adjacent rollers 106, 108 on the opposite side thereof from end 104 of spindle 84. Magnet wire 126 is fed to tube 122 from a supply source (not shown) and is withdrawn therefrom by rollers 106, 108 which advance the wire through passage 90 and tube 92, the wire being dispensed from end 94 of tube 92. The speed of rotation of spindle 84 is appropriately synchronized with the speed of rotation of rollers 106, 108 as dictated by the diameter of the circle defined by abutment members 80, 82 so that as wire 126 is withdrawn and advanced by rollers 106, 108, rotation of spindle 84 and tube 92 pushes the wire outwardly against abutment members 80, 82 thereby to generate skein 36 in a generally circular configuration. It will be observed that skein 36 is generated in the space between top surface 128 of forming members 60 and bottom surface 130 of forming members 70 in their upper positions, skein 36 engaging top surfaces 128 of forming members 60.

It will be observed that upon initial extension of piston rods 76 of cylinders 74, plate 64, members 62 and forming members 60 will follow the initial downward movement of forming members 70 and ring 72 until lost motion pins 66 engage the bottoms of slots 68 in sleeve 54, thereby moving forming members 60 downwardly from their positions shown in solid lines in FIG. 1 to their positions shown in dashed lines.

Referring now additionally to FIGS. 4–7, each of the forming members 60 has a round bottom end 132 defining a curved front surface 134. Top surface 128 is smoothly curved and is joined to smoothly curved front surface 134 by smoothly curved surface 136. Arcuate slot 138 is formed in bottom end 132 of each forming member 60. It will be observed that in the upper position of forming members 60, as shown in solid lines in FIG. 1, front surfaces 134 are disposed within an extension of the interior of the circular array of blades 38 and that bottom ends 132 span a first group 140 of four blades 38. In the lower position of forming members 60, slots 138 receive the distal ends 40 of the respective groups 140 of blades 38, front surfaces 134 of forming members 60 then being disposed within the interior of the circular array of blades 38 (FIG. 3).

Forming members 70 taper radially inwardly to front ends 142 which are arcuately curved to conform to the curvature of the exterior surface of the circular array of blades 38. In the lower positions of members 70 as shown in dashed lines in FIG. 1, front ends 142 are closely adjacent the exterior surfaces of blades 38 and span a second group 144 of four blades (FIG. 3).

Figure 4:
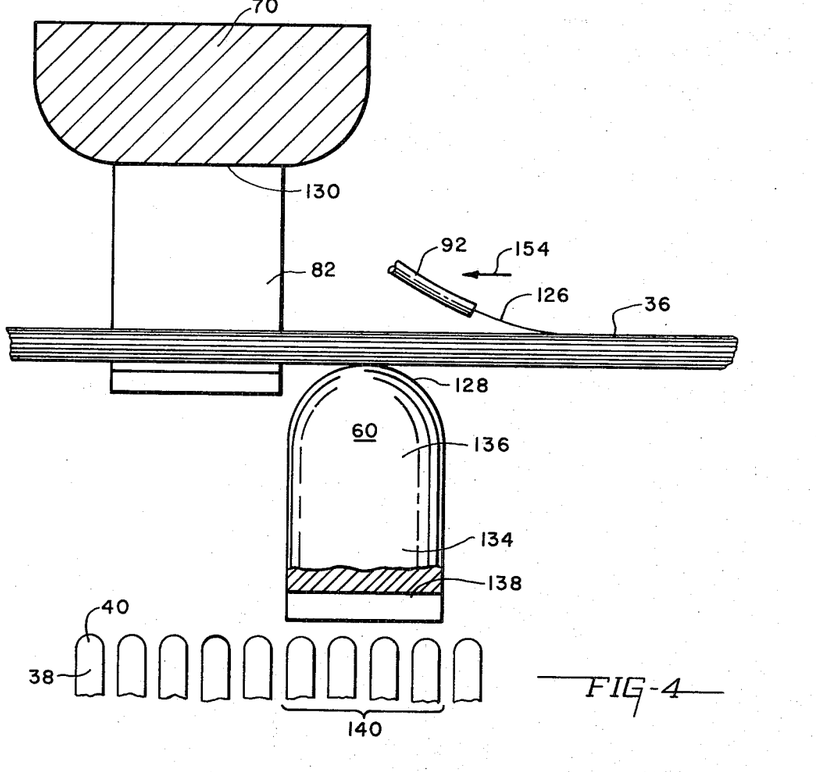
FIG. 4 is a fragmentary cross-sectional view taken generally along the line 4—4 of FIG. 3 and illustrating generation of the skein.
Figure 5:
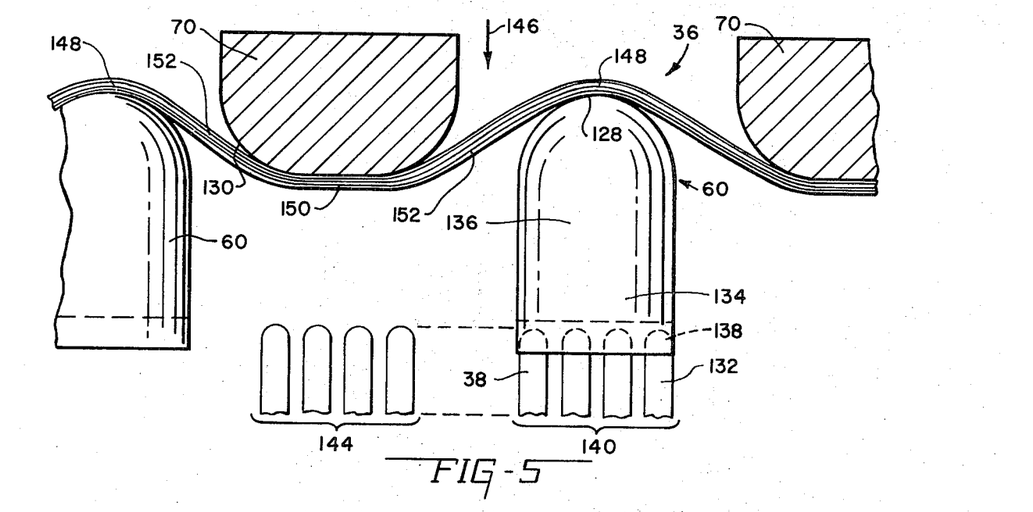
FIG. 5 is a fragmentary cross-sectional view, partly expanded, taken generally along the line 5—5 of FIG. 3, and showing initial formation of the skein into its undulating pattern.

Referring now particularly to FIGS. 3 and 4, it will be seen that skein 36 when initially wound or generated is generally circular in configuration engaging the rear edges of abutment members 80, 82 and top surfaces 128 of forming members 60 adjacent their rear ends. Referring now additionally to FIG. 5, as forming members 70 are initially moved downwardly in the direction shown by arrow 146, forming members 60 move downwardly to their lower positions with distal ends 40 of groups 140 of blades 38 received in slots 138 in bottom ends, 132. Continued downward movement of forming members 70 results in engagement of curved bottom surfaces 130 with skein 36 and initial formation of the skein into an undulating configuration having convexly curved loop sections 150, initially formed by curved bottom surfaces 130 of forming members 70, and concavely formed intermediate sections 148 formed by curved top surfaces 128 of forming members 60, loop sections 150 and intermediate sections 148 being joined by connecting portions 152. This initial undulating formation of skein 36 results in reduction of its diameter and radially inward movement of the skein along top surfaces 128 of forming members 60 and bottom surfaces 130 of forming members 70, as shown by dashed line 36-1 in FIG. 3.

Figure 6:
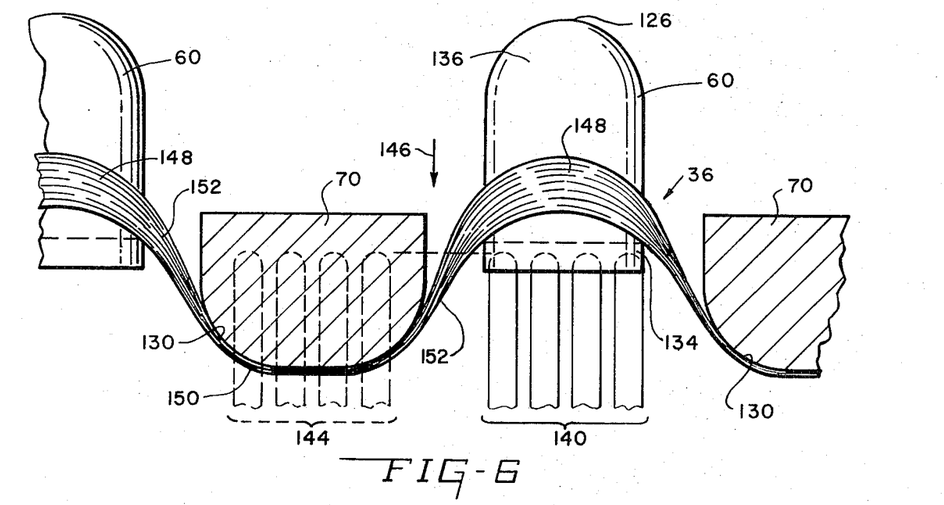
FIG. 6 is a fragmentary cross-sectional view, similar to FIG. 5, taken generally along the line 6—6 of FIG. 3, and showing further formation of the skein.

Referring now to FIGS. 3 and 6, continued downward movement of forming members 70 in direction 146 results in continued formation of loop sections 150, connecting portion 152 and intermediate sections 148, skein 36 continuously moving further radially inwardly to accommodate formation of loop sections 150 and intermediate sections 148, and loop sections 148 moving radially inwardly and downwardly over curved portions 136 of forming members 60 and spreading out, as shown in FIG. 6 and as shown by dashed lines 36-2 in FIG. 3.

Figure 7:
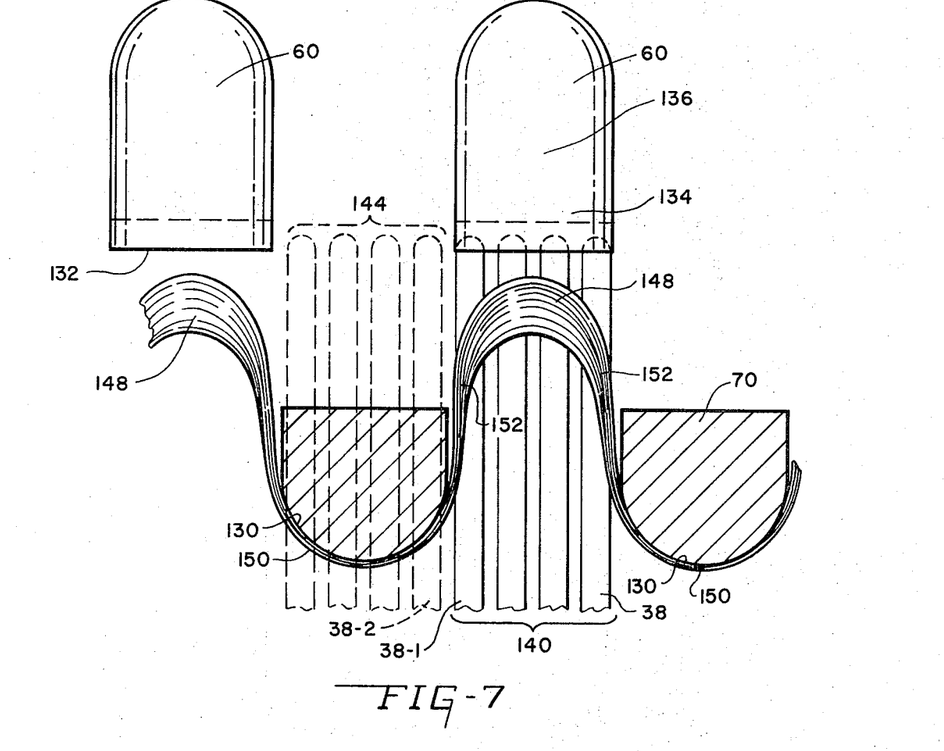
FIG. 7 is a fragmentary cross-sectional view, taken generally along the line 7—7 of FIG. 3 and showing the formed skein following transfer to the insertor blades.

Referring now to FIGS. 3 and 7, movement of forming members 70 to their lowest positions as shown in dashed lines in FIG. 1 and solid lines in FIG. 7 results in completion of the formation of convexly curved loop sections 150 and concavely curved intermediate sections 148, loop sections 148 being pulled radially inwardly over curved portions 136 and curved front surfaces 134 of forming members 60 into the interior of circular array of blades 38, and finally downwardly away from bottom ends 132 of member 60, and connecting portions 152 of skein 36 entering and moving downwardly between respective pairs of blades 38-1, 38-2 on the respective ends of groups 140, 144, the final position of skein 36 being as shown by the dashed line 36-3 in FIG. 3.

Figure 8:
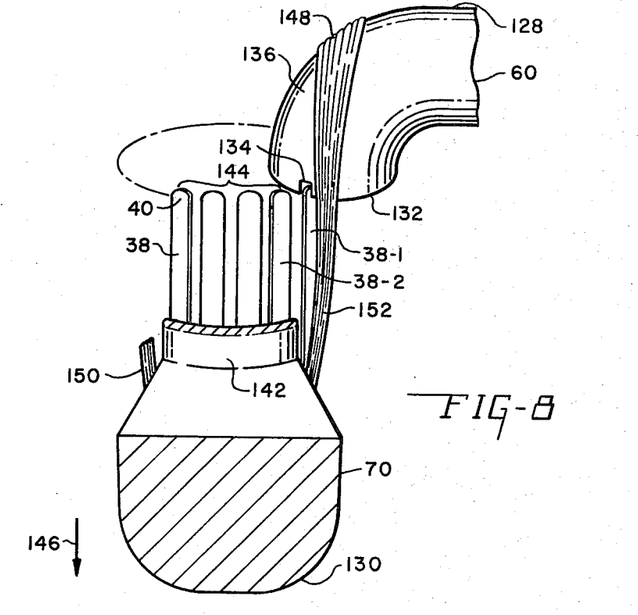
FIG. 8 is a fragmentary view in perspective, partly in cross-section, further illustrating the skein-forming and transfer method of the invention.

Particular reference to FIGS. 1 and 8 will show that the simultaneous forming and transferring action of forming members 60 and forming members 70 upon downward movement thereof to their lower positions results in formation of the three-dimensional undulating skein configuration with concavely curved intermediate sections 148 being disposed on the interior of the circular array of blades 38 adjacent distal ends 40 respectively spanning groups 140 of blades, with convexly curved loop sections 150 being disposed on the exterior of the array adjacent proximal ends 42 and spanning groups 144 blades, and with connecting portions 152 passing through respective pairs of blades 38-1, 38-2 at the ends of adjacent groups of blades 140, 144.

Referring again to FIG. 9, it will be seen that upon insertion of the thus-formed and placed undulating skein 36 in slots 46 of stator core member 48 as further described in the aforesaid U.S. Pat. No. 3,324,536, a six-pole wave winding pattern is provided. It will be readily understood that the generation, forming and transfer of only one skein of a wave winding pattern is described above, the remaining skeins being generated, formed and transferred to appropriate blades 38 of the blade assembly 26, 28 in order to form the desired wave winding pattern upon subsequent transfer to the slots of stator core member 48. In this connection, while rotation of sleeve 84 and tube 92 in the direction shown by arrow 154 is shown (FIG. 4), it will be readily understood that some of the skeins 36 of the complete wave winding pattern will be wound or generated in that direction while other skeins will be wound or generated in the opposite direction with sleeve 84 and tube 92 accordingly being rotated in a direction opposite that shown by arrow 154.

Figure 9:
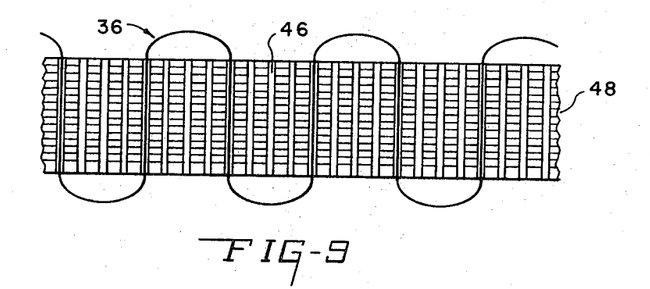
FIG. 9 is a developed view showing a skein following placement in the slots of a dynamoelectric machine stator core member.
Figure 10:
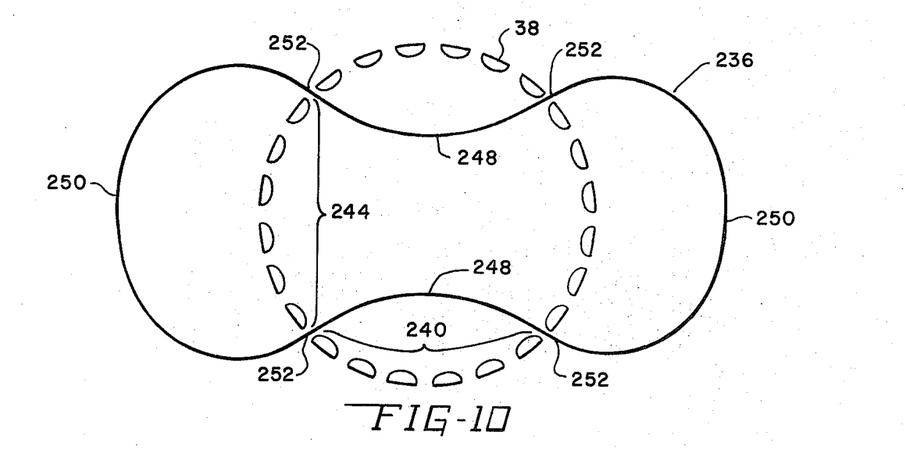
FIG. 10 is a fragmentary top view showing a skein for forming a four-pole winding formed and placed on the insertor blades.

As described above, the illustrated embodiment incorporates three forming members 60 and three forming members 70 to form a six-pole wave winding pattern as shown in FIG. 9. However, the invention is not confined to the formation of a six-pole skein and, as shown in FIG. 10, a four-pole wave winding pattern may be provided. In that case, two forming members 60 would be provided for forming two intermediate skein sections 248, two forming members 70 would be provided to form two loop sections 250, connecting portions 252 of the resulting undulating skein 236 passing through respective pairs of blades of groups 240 and 244, as shown in FIG. 10.

Figure 11:
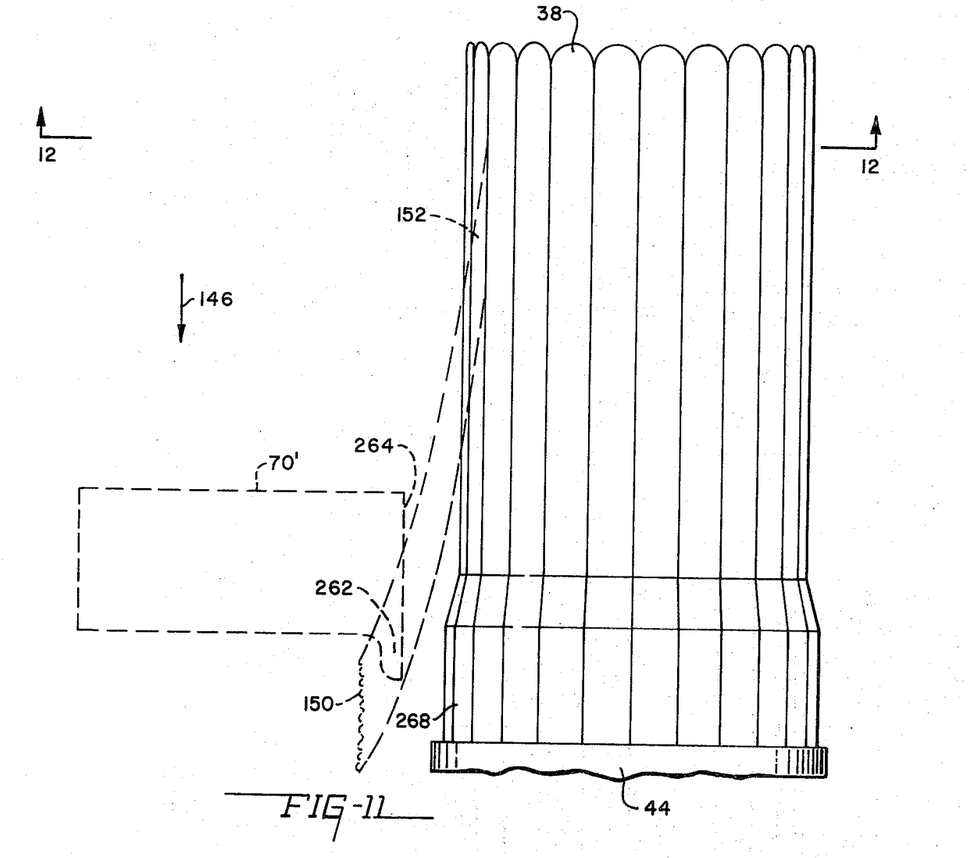
FIG. 11 is a fragmentary side view, partly in cross-section, showing a modified type of forming members.
Figure 12:
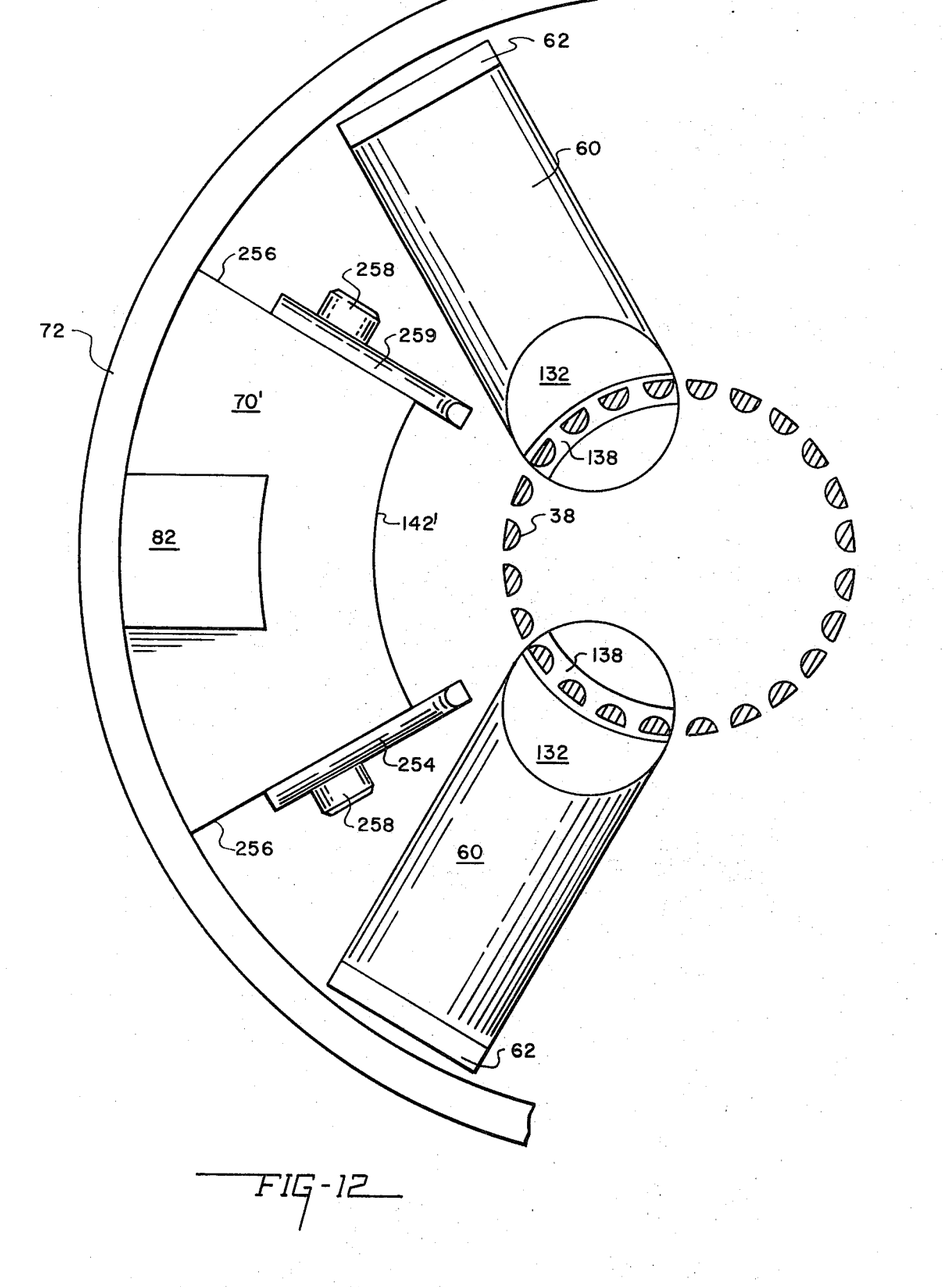
FIG. 12 is a fragmentary bottom cross-sectional view taken generally along the line 12—12 of FIG. 11.

There may be instances where, due to the geometry of inserter blades 38, and particularly the associated wedge guide 268, mounting members 70 shown in FIGS. 1-8, cannot be moved downwardly a sufficient distance to pull intermediate skein sections 148 off of curved front portions 134 of forming members 60 and into the interior of the circular array of blades. Referring now to FIGS. 11 and 12 in which like elements are indicated by like reference numerals and similar elements by primed reference numerals, a modification is shown which alleviates the condition just described. Here, inner ends 142' of mounting members 70' are spaced radially outwardly from the exterior surfaces of blades 38, and forming plates 254 are respectively adjustably attached to opposite sides 256 of each mounting member 70' by cap screws 258 extending through slots 260. Forming plates 254 have downwardly extending projections 262 at their inner ends 264 and have rounded bottom surfaces, as at 266.

It will be seen that inner ends 264 of forming plates 254 are radially spaced outwardly from blades 38 and wedge guides 268 thereby to permit movement of mounting members 70' and forming plates 254 downwardly in direction 146 from the initial position, as shown by solid lines in FIG. 11, to the lower position as shown in dashed lines. The radial adjustment of forming plates 254 on mounting members 70' permits adjustment to accommodate the forming plates to inserter blades and wedge guides have different geometrical configurations, and also permits adjustment to secure proper removal of intermediate skein sections 148 from forming members 60.

While there have been described above the principles of this invention in connection with specific apparatus, it is to be clearly understood that this description is made only by way of example and not as a limitation to the scope of the invention.

What is claimed is:

1. Apparatus for forming and placing a skein of wire on a circular array of blades of coil insertion apparatus for subsequent transfer thereby to the slots of a dynamoelectric machine stator core member to form a wave winding, comprising means for generating a skein of wire, means for initially forming said skein into an undulating configuration having at least two convexly curved loop sections respectively joined by connecting portions to intermediate, concavely curved sections, and for thereafter transferring the thus-formed skein onto said blades with said loop sections being disposed on the exterior of said array and respectively spanning first groups of said blades, with said intermediate sections being disposed on the interior of said array and respectively spanning second groups of said blades, and with said connecting portions passing between respective pairs of said blades at the ends of adjacent first and second groups.

2. The apparatus of claim 1 wherein said forming and transfer means simultaneously forms and transfers said skein.

3. The apparatus of claim 1 wherein said blades have distal ends and proximal ends mounted on a base, said forming and transfer means being proportioned and arranged to form said skein in a three-dimensional undulating configuration with said loop sections extending toward said base and said intermediate sections extending toward said distal ends of said blades following transfer thereto.

4. The apparatus of claim 1 wherein said generating means includes means for forming a skein of generally circular configuration.

5. The apparatus of claim 1 wherein said generating means comprises means for withdrawing said wire from a source and for advancing the same to form said skein.

6. The apparatus of claim 5 wherein said withdrawing and advancing means comprises a pair of rollers engaging said wire therebetween, means for driving said rollers, and means for guiding said wire as it is advanced from said rollers.

7. The apparatus of claim 6 wherein said guiding means comprises an elongated tube having one end adjacent said rollers for receiving the wire advanced thereby, said tube dispensing said wire from its other end, and means for rotating said tube in synchronization with said rollers about an axis passing through said one end, the other end of said tube extending radially with respect to said axis.

8. The apparatus of claim 7 wherein said forming means includes abutment means generally defining a circle, said other end of said tube rotating within said circle thereby dispensing said wire against said abutment means to form a generally circular skein.

9. The apparatus of claim 1 wherein said blades have distal ends and proximal ends mounted on a base, said forming and transferring means comprising a plurality of first forming members for respectively forming said intermediate skein sections, said first forming members being equally angularly spaced around a circle concentric with the axis of said array and extending radially inward toward said axis, said first forming members respectively having front portions joined to bottom ends, said first forming members having a position with said bottom ends spaced axially from and spanning said distal ends of respective second groups of blades and with said front portions extending into an axial extension of the interior of said circular array, said first forming members respectively having top portions joined to said front portions, a plurality of second forming members for respectively forming said loop skein sections, said second forming members being equally angularly spaced around said circle and extending radially inward toward said axis, said second forming members being intermediate said first forming members and respectively having front ends and bottom portions, said second forming members having a first position with said bottom portions spaced axially from said top portions of said first forming members on the side thereof remote from said distal ends, said generating means generating said skein in the space between said top portions of said first forming members and said bottom portions of said second forming members in said first position thereof, and means for moving said second forming members axially from said first position in a direction toward said array to a second position with said front ends spanning the exterior sides of respective first groups of blades and with said bottom portions spaced axially in said direction from said distal ends thereof, said movement of said second forming members causing said bottom portions thereof to engage said skein and form said loop sections thereby pulling said skein radially inwardly and in said direction over said top and front portions of said first forming members to form said intermediate sections, continued movement in said direction of said second forming members to said second position causing said connecting portions respectively to enter the spaces between said pairs of blades and said intermediate sections to be pulled in said direction away from said first forming members into the interior of said array.

10. The apparatus of claim 9 wherein said front and top portions of said first forming members are smoothly curved in cross-section and are joined by a smoothly curved portion, said bottom portions of said second forming members being smoothly curved, said front ends of said second forming members being arcuate to conform to the exterior surface of said array and being closely adjacent the exterior sides of respective first groups of blades in said second position.

11. The apparatus of claim 9 wherein said bottom ends of said first forming members respectively have a clearance formed therein, said first forming members having a second position with said distal ends of said second groups of blades respectively received in said clearances and with said front portions adjacent said bottom ends disposed in the interior of said array.

12. The apparatus of claim 11 further comprising means for moving said first forming members to said second position thereof in response to movement of said second forming members away from said first position thereof.

13. The apparatus of claim 9 wherein said generating means comprises a pair of rollers engaging said wire therebetween on said axis, means for driving said rollers thereby to withdraw said wire from a source and to advance the same, an elongated tube having one end adjacent said rollers on said axis for receiving the wire advanced thereby, said tube dispensing said wire from its other end, said other end of said tube extending radially from said axis and being disposed in said space, and means for rotating said tube about said axis in synchronization with said rollers.

14. The apparatus of claim 9 wherein said apparatus is located at a loading station, and further comprising means for moving said array from said loading station to a coil-transferring station.

15. The apparatus of claim 9 wherein said front ends of said forming members are radially spaced from the exterior sides of respective first groups of blades in said second position.

16. The apparatus of claim 15 wherein each of said forming members comprises a pair of forming plates respectively adjustably attached to opposite sides of a mounting member for radial movement toward and away from said array, each of said forming blades having a projection formed at its front end and extending axially in said direction toward said base.

17. The method of forming and placing a skein of wire on a circular array of blades of coil insertion apparatus for subsequent transfer thereby to the slots of a dynamoelectric machine stator core member to form a wave winding, comprising generating a skein of wire, forming said skein into an undulating configuration having at least two convexly curved loop sections respectively joined by connecting portions to intermediate, concavely curved sections, and transferring the thus formed skein onto said blades with said loop sections being disposed on the exterior of said array and respectively spanning first groups of said blades, with said intermediate sections being disposed on the interior of said array and respectively spanning second groups of said blades, and with said connecting portions passing between respective pairs of said blades at the ends of adjacent first and second groups.

18. The method of claim 17 wherein said forming and transferring steps are simultaneously performed.

19. The method of claim 17 wherein said blades have distal ends and proximal ends mounted on a base, said skein being formed in a three-dimensional undulating configuration during said forming step so that said loop sections extend toward said base and said intermediate sections extend toward said distal ends following said transferring step.

20. The method of claim 17 wherein said skein is formed in a generally circular configuration during said generating step.

21. The method of claim 17 wherein said generating step comprises withdrawing said wire from a source and advancing the same, and pushing the advancing wire to form said skein.

* * * * *